United States Patent [19]
Wade, Jr.

[11] Patent Number: 6,148,636
[45] Date of Patent: Nov. 21, 2000

[54] APPARATUS FOR DISPENSING DRY ICE

[75] Inventor: Elton Jefferson Wade, Jr., Mechanicsville, Va.

[73] Assignee: East End Machine, Inc., Mechanicsville, Va.

[21] Appl. No.: 09/390,226

[22] Filed: Sep. 3, 1999

Related U.S. Application Data

[60] Provisional application No. 60/100,104, Sep. 14, 1998.

[51] Int. Cl.[7] ........................................................ F25J 1/00
[52] U.S. Cl. .................. 62/604; 62/605; 62/49.1; 222/361; 222/561
[58] Field of Search ............................ 62/604, 605, 49.1, 62/341; 222/361, 444, 559, 561

[56] References Cited

U.S. PATENT DOCUMENTS

| | | |
|---|---|---|
| 1,795,772 | 3/1931 | Goosmann . |
| 1,919,698 | 7/1933 | Hessling . |
| 2,016,815 | 10/1935 | Gilmore et al. ............................ 62/121 |
| 2,025,698 | 12/1935 | Cole et al. .................................. 62/121 |
| 2,120,943 | 6/1938 | Schutz ........................................ 62/121 |
| 2,145,096 | 1/1939 | Schutz ........................................ 62/121 |
| 2,151,855 | 3/1939 | Kobold ....................................... 62/121 |
| 2,499,386 | 3/1950 | Joerren ............................................ 62/1 |
| 3,011,296 | 12/1961 | Woserau et al. ........................... 53/124 |
| 4,277,002 | 7/1981 | Christensen et al. ..................... 222/349 |
| 4,394,942 | 7/1983 | Yoshioka ................................... 222/361 |
| 4,412,852 | 11/1983 | Umino et al. ................................ 62/35 |
| 4,780,119 | 10/1988 | Brooke ......................................... 62/12 |
| 5,135,553 | 8/1992 | Rebban ........................................ 62/35 |
| 5,183,507 | 2/1993 | Scherer ...................................... 118/18 |
| 5,409,137 | 4/1995 | Bonomelli ................................. 222/56 |
| 5,419,138 | 5/1995 | Anderson et al. ........................... 62/35 |
| 5,473,903 | 12/1995 | Lloyd et al. ................................. 62/35 |
| 5,475,981 | 12/1995 | Becker ........................................ 62/35 |
| 5,528,907 | 6/1996 | Pint et al. .................................. 62/604 |
| 5,548,960 | 8/1996 | Anderson et al. ........................ 62/605 |

*Primary Examiner*—William E. Tapolcai
*Attorney, Agent, or Firm*—McGuireWoods, LLP

[57] ABSTRACT

A dry ice dispenser apparatus for dispensing a metered volume of dry ice into a receiving well. The apparatus includes a dry ice source, such as a hopper, or a dry ice producing apparatus for supplying dry ice to a metering carriage. The metering carriage delivers a metered volume of dry ice to a receiving well. The metering carriage is contained in a carriage slide assembly which includes a pair of guide walls, a closed floor portion connection to a bottom portion of the guide walls and a discharge opening located above the receiving well. The apparatus may contain a pellet press for forming dry ice pellets when the dry ice is delivered to the receiving well.

12 Claims, 9 Drawing Sheets

APPARATUS FOR DISPENSING DRY ICE

This Application claims the benefit of U.S. Provisional Application No. 60/100,104 filed on Sept. 14, 1998.

BACKGROUND OF THE INVENTION

The present invention is directed to an apparatus for dispensing a metered volume of dry ice.

SUMMARY OF THE INVENTION

The invention includes a dry ice source for supplying dry ice having at least one metering channel opening. The apparatus further includes a carriage slide assembly positioned below the dry ice source extending along a carriage axis. The carriage slide assembly includes a pair of guide walls extending along the carriage axis where each guide wall has a top portion and a bottom portion. The carriage slide assembly further includes a closed floor portion between the guide walls connected to the bottom portion of the guide walls. The closed floor portion defines at least one discharge opening for each of the at least one metering channel openings.

The apparatus further includes a metering carriage for receiving the metered volume of dry ice from the dry ice source and delivering the metered volume of dry ice to the at least one discharge opening. The metering carriage is slidably received between the pair of guide walls for translational movement along the carriage axis. The metering carriage has a height and defines at least one metering channel for each of the at least one metering channel openings for receiving a metered volume of dry ice when the at least one metering channel is in registration with the at least one metering channel opening of the dry ice source. Each of the at least one metering channels extends along a metering channel axis, spans the height of the metering carriage and defines a metering volume. The metering carriage has a length sufficient to close each of the at least one metering openings when the at least one metering channel is in registration with the at least one discharge opening.

The apparatus further includes a receiving well positioned below the at least one discharge opening of the carriage slide assembly for receiving the metered amount of dry ice from the metering carriage when the at least one metering channel is in registration with the at least one discharge opening of the carriage slide assembly.

The invention further includes a hopper for the dry ice source. Additionally, the invention may include an agitator contained in the hopper.

The invention further includes a pellet press having an at least one upper piston and an at least one lower piston for each of the at least one discharge openings. Each of the at least one lower pistons are slidably received in the at least one receiving well and form a base therein. Each at least one upper piston is positioned above the at least one discharge opening and is sized to be slidably received in the at least one discharge opening such that once the metered volume of dry ice is delivered to at least one receiving well, the dry ice rests on the base and the at least one upper piston slidably moves through the at least one discharge opening and applies sufficient pressure to the dry ice to form a pellet.

Further, the invention may include two metering channel openings. The invention also includes a means for synchronizing the movement of the metering carriage, the at least one upper piston, and the at least one lower piston such that the at least one upper piston is in an upper position when the at least one metering channel is in registration with the at least one discharge opening. Further the means for synchronizing includes lowering the at least one upper piston into the at least one discharge opening after the metering carriage clears the at least one discharge opening. The means for synchronizing also includes returning the at least one upper piston to an upper position while the at least one lower piston is raised to a position flush with the at least one discharge opening. The means for synchronizing also includes lowering the at least one lower piston as the metering carriage returns to a position in registration with the at least one discharge opening.

The invention further includes a dry ice producing apparatus as the dry ice source. The dry ice producing apparatus may include a snow chamber. The invention further includes at least one snow chamber for each of the at least one metering channels.

BRIEF DESCRIPTION OF THE DRAWINGS

FIG. I is a side view showing one embodiment of the dry ice dispenser apparatus showing a hopper as the dry ice source.

DETAILED DESCRIPTION OF THE PREFERRED EMBODIMENT

Figure 1:
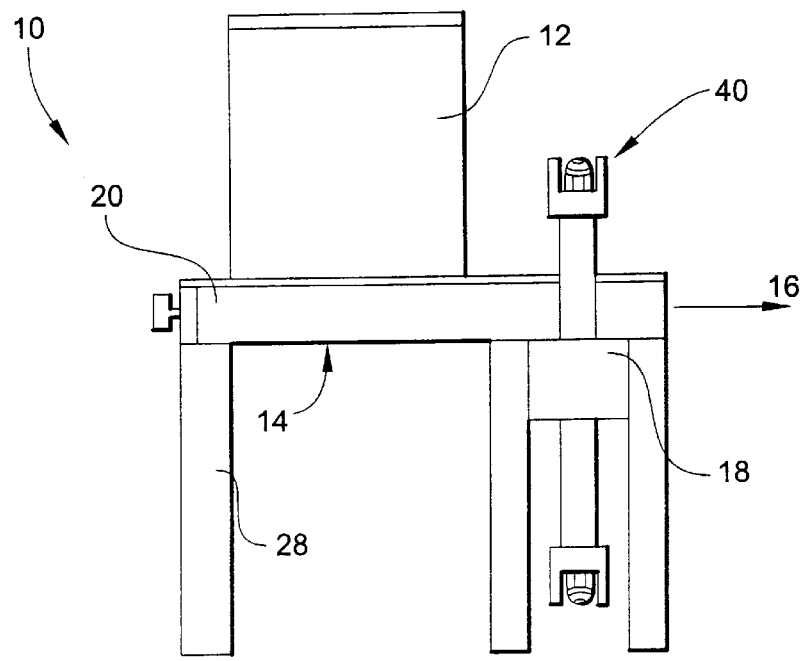
Figure 2:
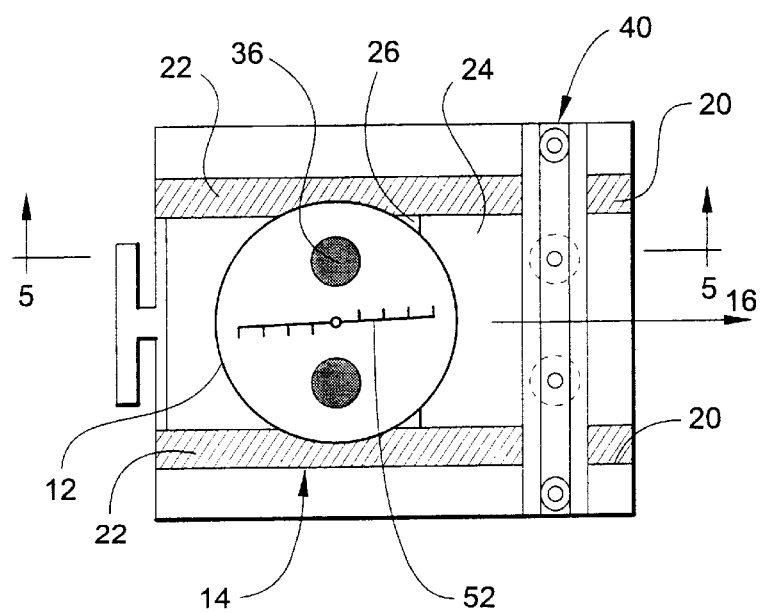
FIG. 2 is a top view of the dry ice dispenser apparatus shown in FIG. 1.
Figure 3:
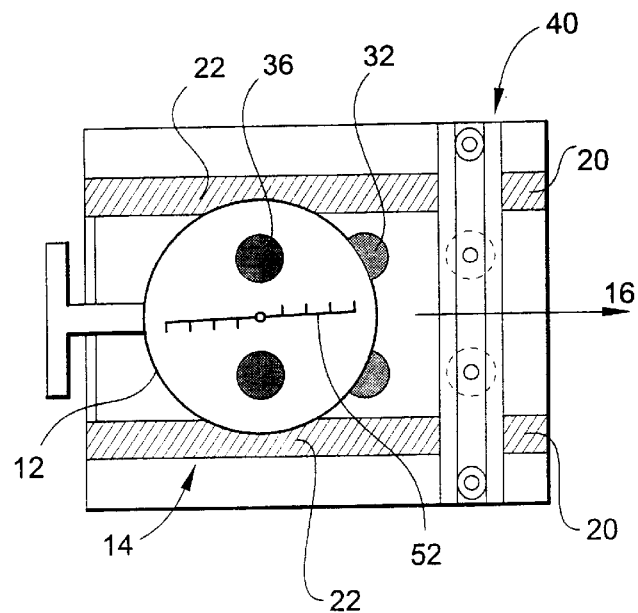
FIG. 3 is a top view of the dry ice dispenser apparatus shown in FIG. I when the carriage block has moved from underneath the hopper and the metering channels in the carriage block are partially visible.
Figure 4:
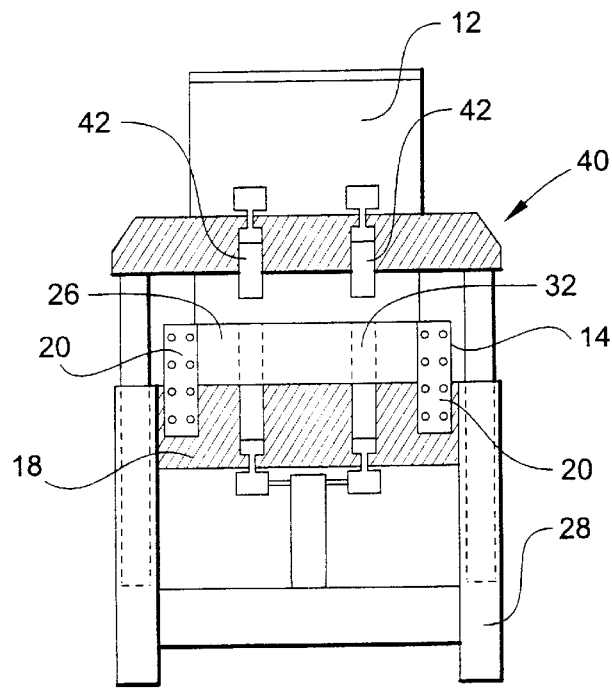
FIG. 4 is an end view of the invention shown in FIG. 1.

Turning now to the drawings, and more particularly, to FIG. 1, a first embodiment of the dry ice dispenser apparatus according to the present invention is illustrated generally at 10. The dry ice dispenser apparatus delivers a metered volume of dry ice from a dry ice source 12 to a receiving well 18. A carriage slide assembly 14 positioned below the dry ice source extending along a carriage axis 16 is used to deliver a metered volume of dry ice to a receiving well 18.

Figure 5:
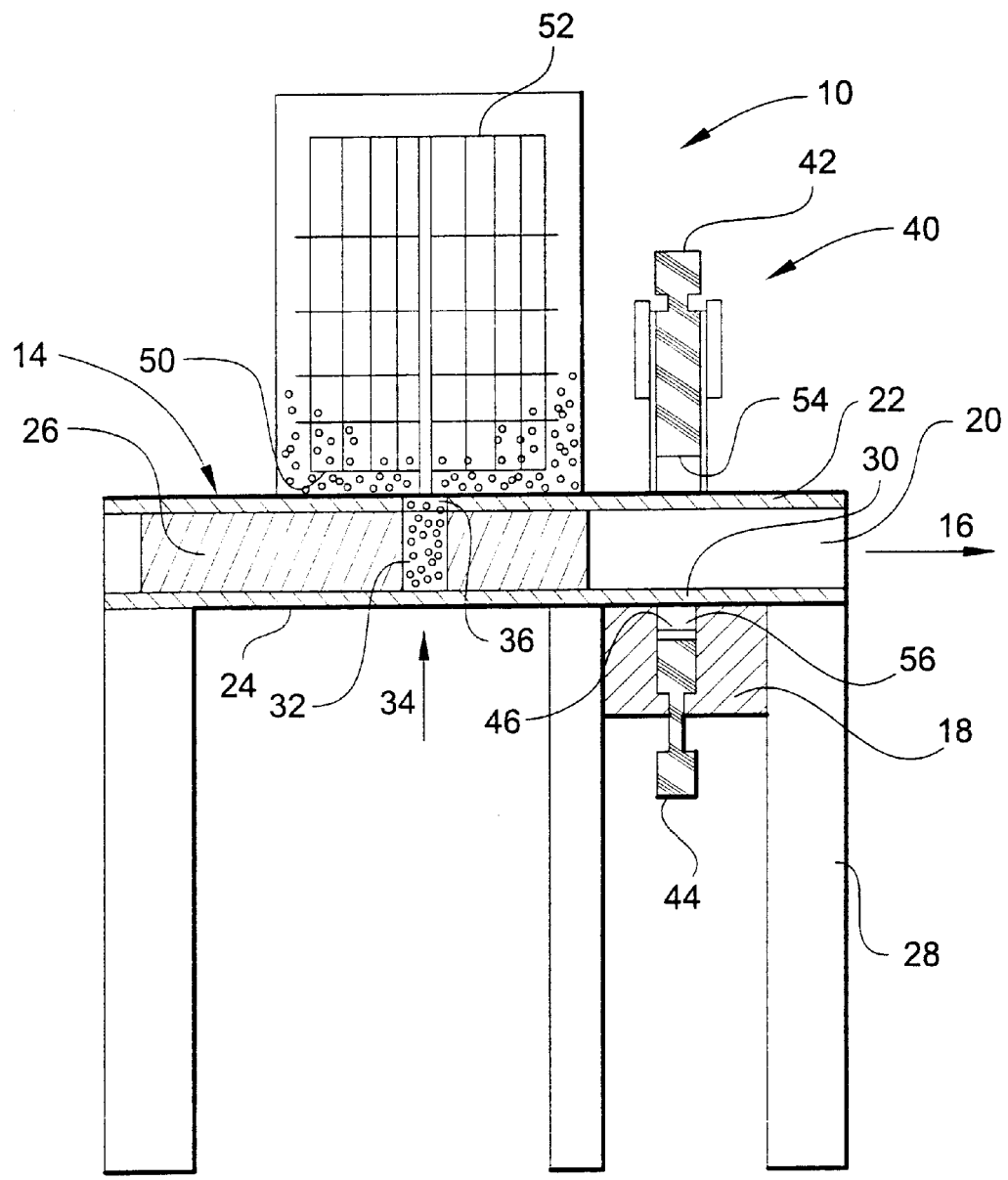
FIG. 5 is a cross-sectional view of the dry ice dispenser apparatus shown in FIG. 2 taken along line 5—5.
Figure 6:
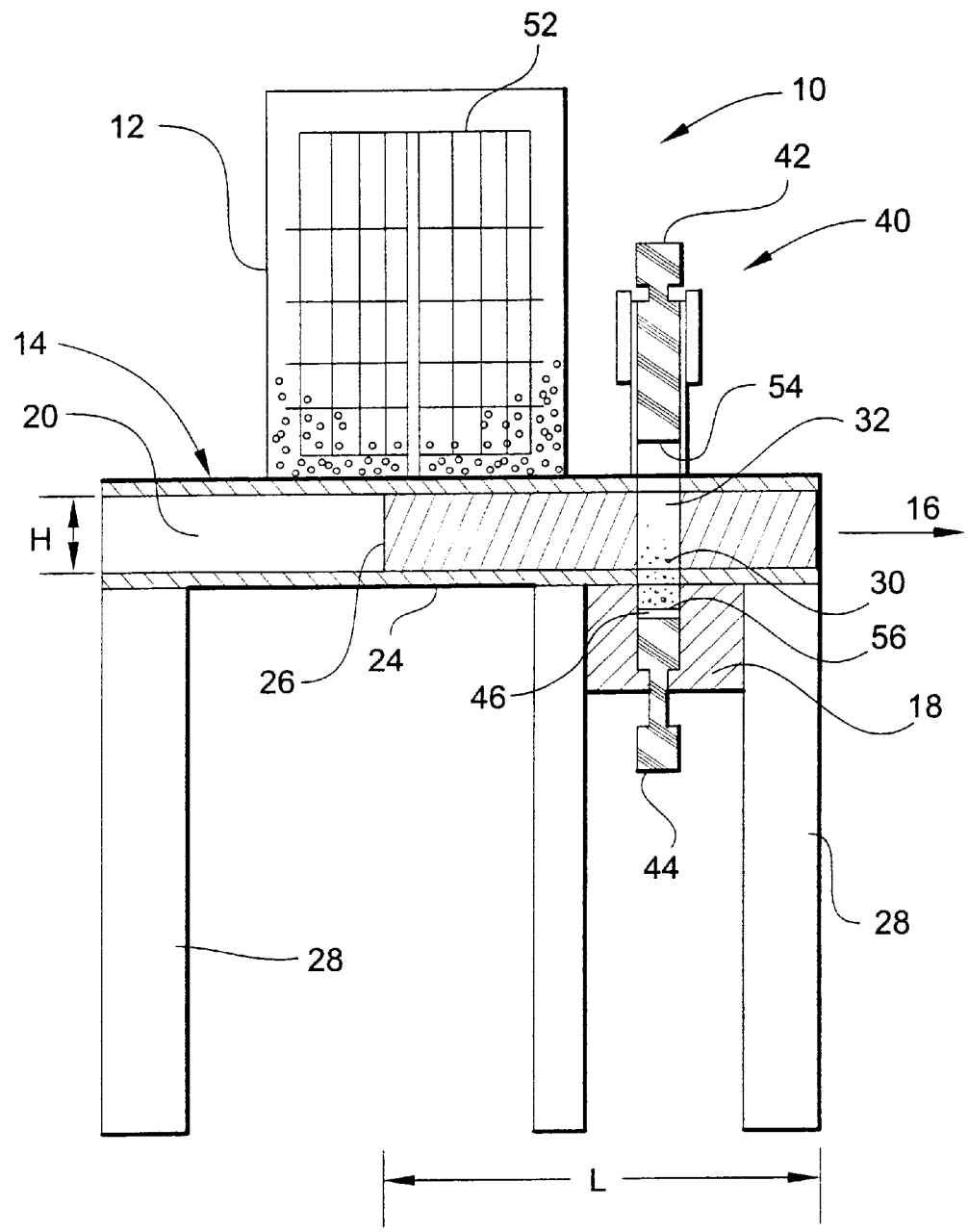
FIG. 6 is a cross-sectional view of the dry ice dispenser apparatus shown in FIG. 2 taken along line 5—5 where the metering carriage is in registration with the discharge opening.
Figure 7:
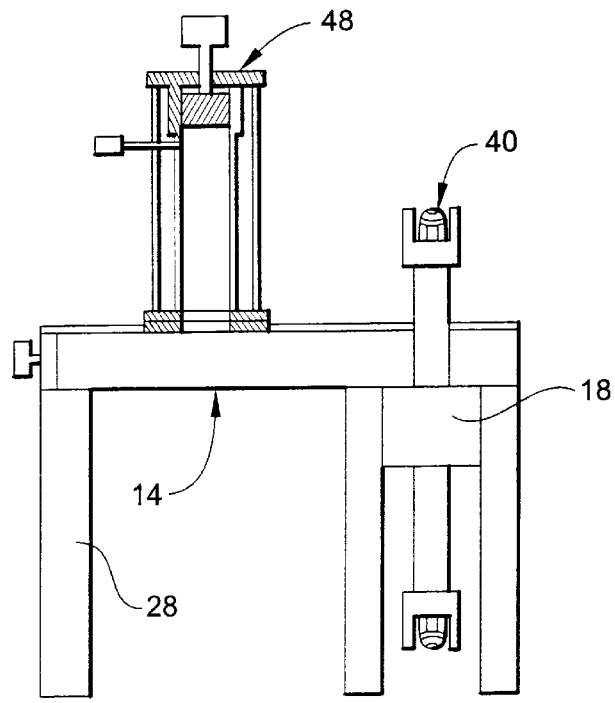
FIG. 7 is a side view showing a second embodiment of the dry ice dispenser apparatus showing snow chambers as the dry ice source.
Figure 8:
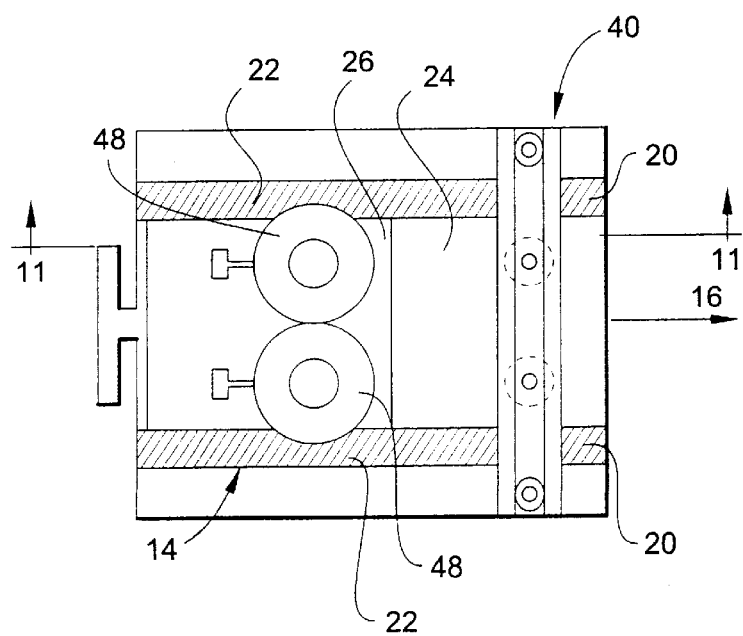
FIG. 8 is top view of the dry ice dispenser apparatus shown in FIG. 7.
Figure 9:
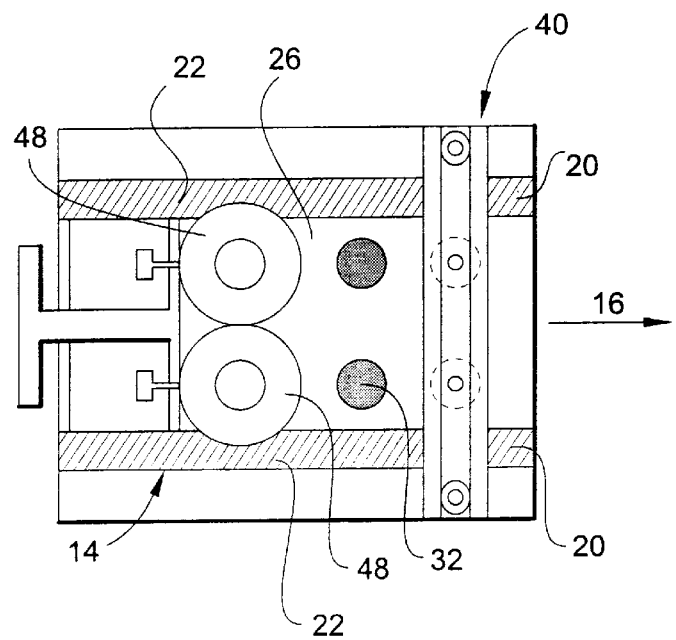
FIG. 9 is a top view of the dry ice dispenser apparatus shown in FIG. 7 when the carriage block has moved from underneath the hopper and the metering channels in the carriage block are visible.
Figure 10:
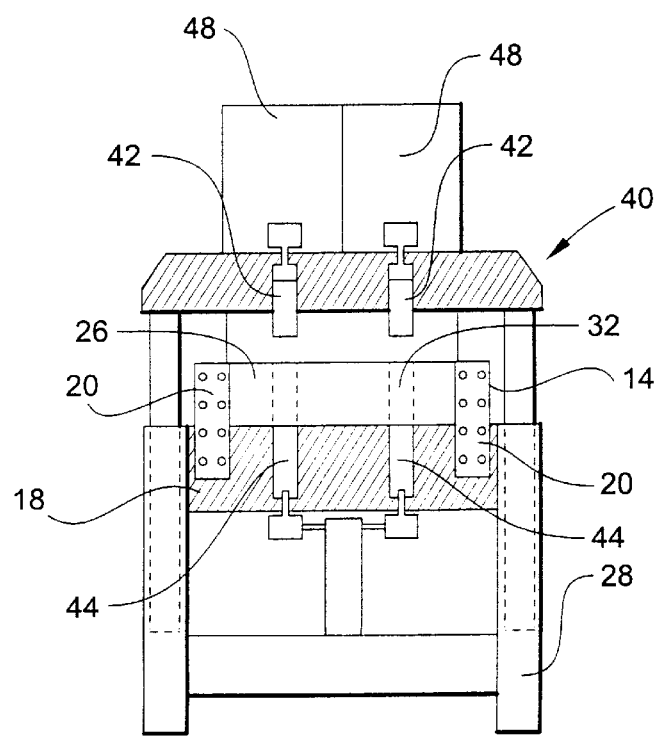
FIG. 10 is an end view of the dry ice dispenser apparatus shown in FIG. 7.
Figure 11:
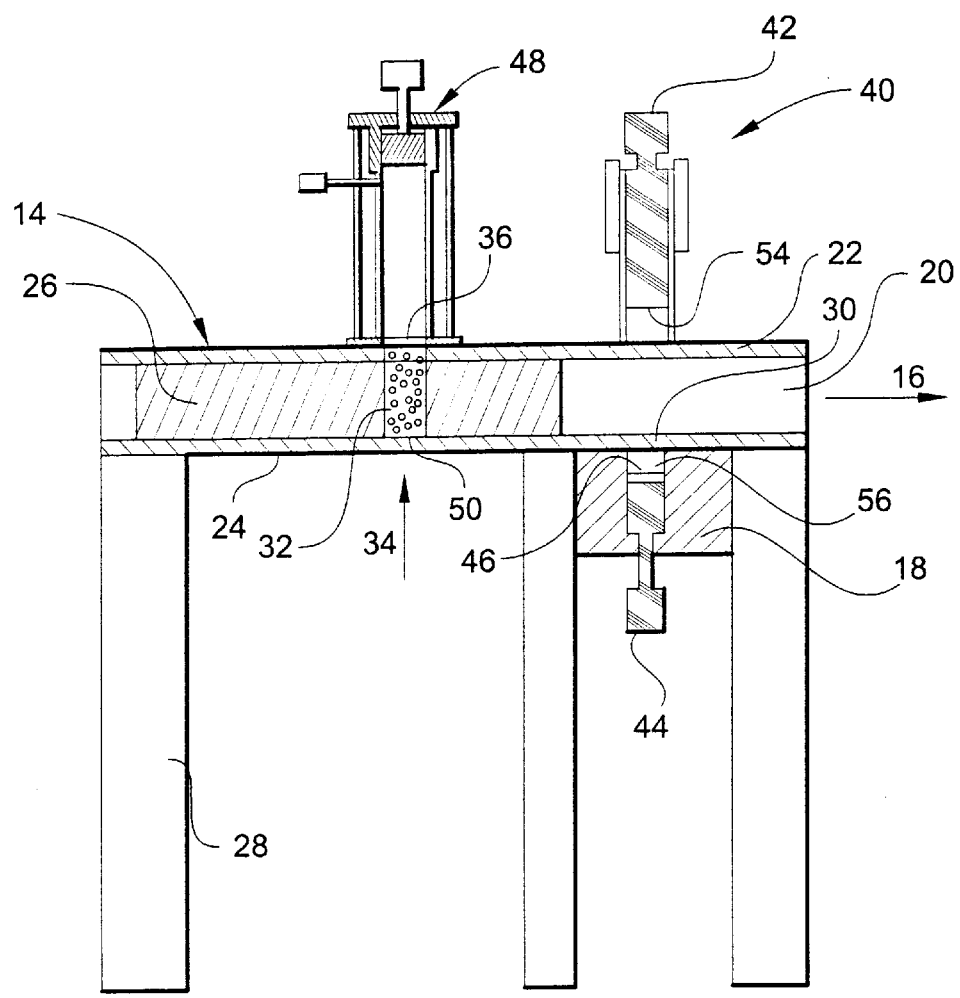
FIG. 11 is a is a cross-sectional view of the dry ice dispenser apparatus shown in FIG. 8 taken along line 11—11.
Figure 12:
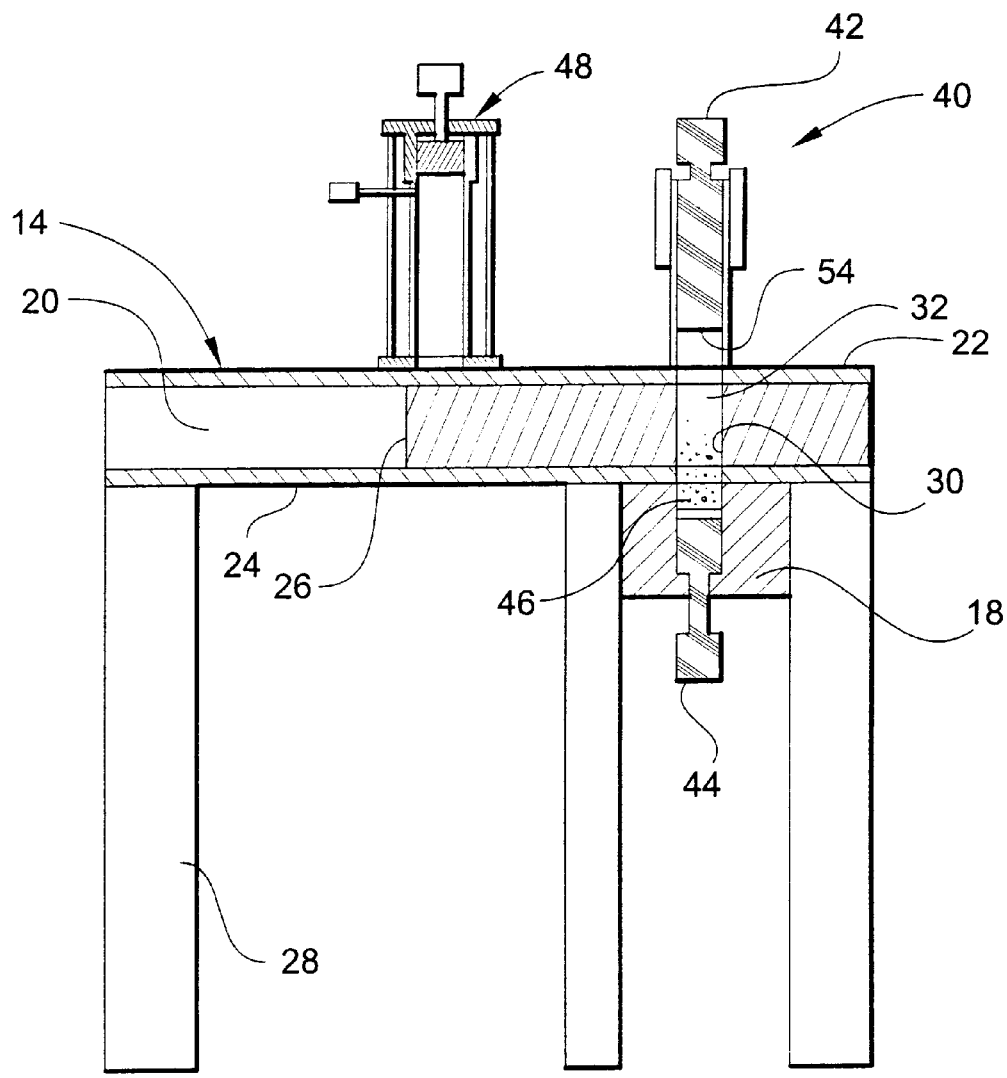
FIG. 12 is a cross-sectional view of the dry ice dispenser apparatus shown in FIG. 8 taken along line 11—11 where the metering carriage is in registration with the discharge opening.

Turning now to FIGS. 5 and 6, the details of the carriage slide assembly 14 and the hopper 12 are shown. The hopper 12 is configured to contain an amount of dry ice snow. Preferably, the hopper 12 is cylindrical and contains at least one metering channel opening 36 at the bottom of the hopper 12. The hopper 12 may be constructed of any material sufficient to contain an amount of dry ice. Such materials include but are not limited to, metal, plastic, stainless steel, or other materials known to those skilled in the art which are sufficient to contain an amount of dry ice. In a preferred embodiment, the hopper 12 is equipped with an agitator 52 for facilitating the movement of dry ice from the hopper 12 through the metering channel openings 36.

Figure 13:
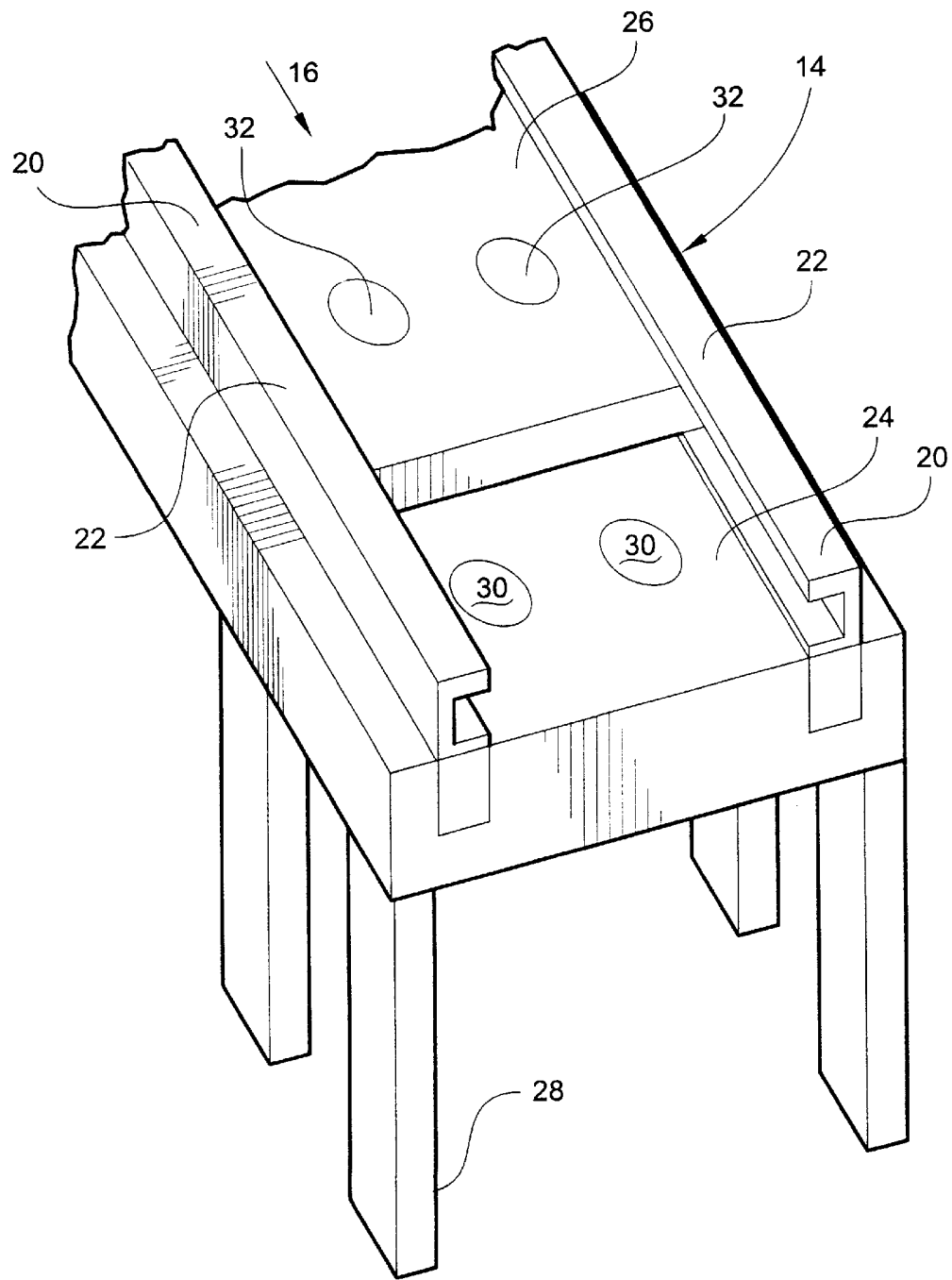
FIG. 13 is a partial perspective view of the carriage slide assembly and the carriage block in the slide assembly, drawn without the dry ice source or pellet press apparatus.

With reference now to FIG. 13 and continuing reference to FIGS. 5 and 6, the details of the carriage slide assembly 14 are shown. The carriage slide assembly 14 includes a pair of guide walls 20 that extends along the carriage axis 16. Each guide wall has a top portion 22 and a bottom portion 24. The top portion 22 and bottom portion 24 maintain the metering carriage 26, to be described in detail below, therebetween such that the metering carriage can move along the carriage axis 16. The carriage slide assembly 14 may be made of any resilient material, including but not limited to stainless steel, hard plastic or any other material known to those skilled in the art. Preferably, the carriage slide assembly 14 is mounted on a plurality of legs, one such leg being designated as 28.

The metering carriage 26 is designed to receive a metered volume of dry ice from the dry ice source 12 and deliver the metered volume of dry ice through a discharge opening 30 into the receiving well 18. The metering carriage 26 is slidably received between the pair of guide walls 20 for translational movement along the carriage axis 16. The metering carriage 26 has a height, H, and defines a metering channel 32. The metering channel 32 extends along a metering channel axis 34. Preferably, the metering channel axis 34 is at an angle to facilitate the movement of dry ice from the dry ice source 12 into the metering channel 32. In a preferred embodiment, the metering channel axis is about perpendicular to the carriage axis 16.

With reference now to FIG. 6, the metering carriage has a length, L, sufficient to close the metering channel opening 36 in the dry ice source 12 when the metering channel 32 is in registration with the discharge opening 30. The metering carriage 26 of the present invention may be made out of any resilient material suitable for handling dry ice known to those skilled in the art, including, but not limited to stainless steel and hard plastics.

The metering carriage 26 may contain more than one metering channel 32. In a preferred embodiment, the apparatus contains at least one metering channel 32 and preferably contains two metering channels. For each metering channel opening 36 in the dry ice source 12, there is a corresponding metering channel 32 in the metering carriage 26 for receiving a metered volume of dry ice from the dry ice source 12. It will be appreciated by those skilled in the art that the metering channel 32 can take on a variety of shapes. Preferably the metering channel 32 is cylindrical and the metering channel opening 36 has about the same diameter as the metering channel 32.

With continuing reference to FIG. 6, there is shown an embodiment of the present invention where the metering carriage 26 is in a forward position such that the metering channel 32 is in registration with the discharge opening 30. The discharge opening 30 is located above a receiving well 18. Preferably, there is a receiving well 18 for each of the metering channel openings 36 and each of the metering channels 32. In a preferred embodiment, there are two receiving wells 18 for receiving a metered volume of dry ice from two metering channels 32. It will be appreciated by those skilled in the art that receiving well 18 may take on a variety of shapes depending on the desired shape of the dry ice pellet. In a preferred embodiment, the receiving well 18 is cylindrical. However, the shape of the receiving well 18 may include, but is not limited to being square, rectangular, triangular, hexagonal, or some other polygonal shape.

In a preferred embodiment, the dry ice dispenser apparatus 10 includes a pellet press 40. The pellet press has an upper piston 42 and a lower piston 44. The lower piston 44 is slidably received in the receiving well 18 for reciprocating movement therein. Further, the top of the lower piston 44 forms a base 46 in the receiving well 18. The upper piston 42 is sized to be slidably received through the discharge opening 30 and into the receiving well 18. Preferably, there is an upper piston 42 and a lower piston 44 for each of the receiving wells 18 and metering channels 32. The upper piston 42 and the lower piston 44 can be made from any material sufficient to press dry ice. Materials include, but are not limited to metal, stainless steel, hard plastics or any other material known to those skilled in the art suitable for pressing dry ice. Preferably, the upper piston 42 and the lower piston 44 each have non-stick surfaces 54 and 56, respectively. The surfaces should be made of a material suitable to prevent the dry ice from sticking to the pistons 42 and 44. Non-stick materials include, but are not limited to, plastics and teflon.

The movement of pistons 42 and 44 and the metering carriage 26 may be controlled by hydraulic systems known to those skilled in the art.

With reference now to FIGS. 7–12, there is shown a second embodiment of the present invention. In the second embodiment of the present invention, the hopper 12 has been replaced with a dry ice producing apparatus 48. The dry ice producing apparatus 48 is positioned above the carriage slide assembly 14 and has a metering channel opening 36. In a preferred embodiment, the dry ice producing apparatus is a snow chamber that converts liquid carbon dioxide ($CO_2$) into solid carbon dioxide (dry ice). One such dry ice producing apparatus is the snow chamber disclosed in U.S. Patent Application entitled "Apparatus for Facilitating the Formation, Capture and Compression of Solid Carbon Dioxide Particles", filed on Jun. 17, 1999, in the name of Elton J. Wade, Jr., herein specifically incorporated by reference. In a preferred embodiment, there is a snow chamber 48 for each metering channel 32 in the metering carriage 26.

The carriage slide assembly 14, the metering carriage 26, the receiving well 18, and the pellet press 40 are configured substantially the same as discussed above.

The operation of the dry ice dispenser apparatus will now be explained in detail. With reference now to FIG. 5, there is shown apparatus in accordance with the present invention of where the metering channel 32 is in registration with the metering channel opening 36 of the hopper 12. When a hopper 12 is used as the dry ice source, dry ice pellets or snow 50 are loaded into the hopper. In a preferred embodiment, the hopper 12, contains an agitator 52 for stirring the dry ice snow 50. As dry ice snow 50 is loaded into the hopper 12, dry ice falls through the metering channel opening 36 into the metering channel 32 and rests on the bottom portion of the carriage slide assembly. When the metering channel 32 is filled with dry ice, the metering carriage 26 is moved along the carriage axis 16 until the metering channel 32 is in registration with the discharge opening 30, as more clearly shown in FIG. 6. When the metering channel is in registration with the discharge opening 30, the dry ice snow falls into the receiving well and rests on the part of the lower piston 44 that forms a base 46 of the receiving well 18. After the metered volume of dry ice snow is delivered to the receiving well 18 the metering carriage 26 returns to a position where the metering channel 32 is in registration with the metering channel opening 36.

Once the metering carriage 26 has cleared the discharge opening 30, the upper piston 42 is lowered through the discharge opening and into the receiving well 18. The upper piston 42 applies pressure to the dry ice to form a dry ice pellet. The pellet will take on the shape of the receiving well 18. After applying pressure to produce a dry ice pellet, the upper piston 42 is raised to its initial starting position and the lower piston 44 is raised through the receiving well 18 and through the discharge opening 30 until the top of the lower piston 44 that forms the base 46 of the receiving well is flush with the bottom portion 24 of the carriage slide assembly 14, thereby raising the dry ice pellet out of the receiving well 18. At this stage, the pressed pellet will be resting on the lower piston 44 such that when the metering carriage 26 slides across the discharge opening 30, the dry ice pellet is pushed off the bottom portion 24 of the carriage slide assembly 14. As the metering carriage 26 moves to place the metering channel 32 in registration with the discharge opening 30, the lower piston 44 is lowered back into its original position in the receiving well 18.

When the hopper is replaced with a dry ice producing apparatus 48 such as a snow chamber similar to that shown in FIGS. 7–12, the operation of the metering carriage 26 and the pellet press 40 is substantially the same as that used for the hopper 12. However, dry ice does not need to be loaded in the dry ice producing apparatus 48 because the dry ice producing apparatus 48 is able to continuously produce dry ice snow which will be supplied to the metering channel 32 of the metering carriage 26. In this way, dry ice snow may be produced and formed into a dry ice pellet using the same apparatus.

Preferably, the apparatus includes a means for synchronizing the movement of the metering carriage, the upper piston and the lower piston such that the upper piston is in an upper position when the metering channel of the metering carriage is in registration with the discharge opening, the upper piston is lowered into the discharge opening after the metering carriage clears the discharge opening, the upper piston returns to an upper position, while the lower piston is raised to a position that is flush with the discharge opening, and the lower piston is lowered as the metering carriage returns to a position is registration with the discharge opening.

The means for synchronizing the movement of the metering carriage 26, and the pistons 42 and 44 may include a series of electronic eyes for triggering movement, or other triggering means known to those skilled in the art.

Those persons skilled in the art will therefore readily understand that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An apparatus for dispensing a metered volume of dry ice, the apparatus comprising:
    a dry ice source for supplying dry ice, the dry ice source defining at least one metering channel opening;
    a carriage slide assembly positioned below the dry ice source, extending along
        a carriage axis, the carriage slide assembly comprising:
        a pair of guide walls extending along the carriage axis, each guide wall having a top portion and a bottom portion; and
        a closed floor portion between the guide walls and connected to the bottom portion of the guide walls wherein the closed floor portion defines at least one discharge opening for each of the at least one metering channel openings;
    a metering carriage for receiving the metered volume of dry ice from the dry ice source and delivering the metered volume of dry ice to the discharge opening, the metering carriage slidably received between the pair of guide walls for translational movement along the carriage axis, the metering carriage having a height and defining at least one metering channel for each of the at least one metering channel openings for receiving a metered volume of dry ice when the at least one metering channel is in registration with the at least one metering channel opening of the dry ice source, wherein the at least one metering channel extends along a metering channel axis and spans the height of the carriage assembly, and wherein the metering carriage has a length sufficient to close the at least one metering opening when the at least one metering channels are in registration with the at least one discharge opening; and
    at least one receiving well positioned below the at least one discharge opening of the carriage slide assembly for receiving the metered amount of dry ice from the metering carriage when the at least one metering channel is in registration with the at least one discharge opening of the carriage slide assembly.

2. The apparatus of claim 1 wherein the dry ice source is a hopper.

3. The apparatus of claim 2 further comprising an agitator contained in the hopper.

4. The apparatus of claim 3 further comprising a pellet press having an at least one upper piston and an at least one lower piston for each at least one discharge opening, each at least one lower piston being slidably received in the receiving well and forming a base therein, and each at least one upper piston being positioned above each at least one discharge opening and sized to be slidably received in the at least one discharge opening such that when the metered volume of dry ice is delivered to the receiving well, the dry ice rests on the base and the at least one upper piston slidably moves through the at least one discharge opening and applies sufficient pressure to the dry ice to form a pellet.

5. The apparatus of claim 4 wherein the number of metering channel openings is two.

6. The apparatus of claim 4 wherein the apparatus further comprises a means for synchronizing the movement of the metering carriage the at least one upper piston and the at least one lower piston such that:

the at least one upper piston is in an upper position when the at least one metering channel of the metering carriage is in registration with the at least one discharge opening;

the at least one upper piston is lowered into the at least one discharge opening after the metering carriage clears the at least one discharge opening;

the at least one upper piston returns to an upper position while the at least one lower piston is raised to a position that is flush with the at least one discharge opening; and the at least one lower position is then lowered as the metering carriage is returns to a position in registration with the at least one discharge opening.

7. The apparatus of claim 1 wherein the dry ice source is a dry ice producing apparatus.

8. The apparatus of claim 7 wherein the dry ice producing apparatus is a snow chamber.

9. The apparatus of claim 8 further comprising a snow chamber for each of the at least one metering channel openings.

10. The apparatus of claim 9 further comprising a pellet press having an at least one upper piston and an at least one lower piston for each at least one discharge opening, each at least one lower piston being slidably received in the receiving well and forming a base therein, and each at least one upper piston being positioned above each at least one discharge opening and sized to be slidably received in the at least one discharge opening such that when the metered volume of dry ice is delivered to the receiving well, the dry ice rests on the base and the at least one upper piston slidably moves through the at least one discharge opening and applies sufficient pressure to the dry ice to form a pellet.

11. The apparatus of claim 10 wherein the number of meter channel openings is two.

12. The apparatus of claim 10 wherein the apparatus further comprises a means for synchronizing the movement of the metering carriage the at least one upper piston and the at least one lower piston such that:

the at least one upper piston is in an upper position when the at least one metering channel of the metering carriage is in registration with the at least one discharge opening;

the at least one upper piston is lowered into the at least one discharge opening after the metering carriage clears the at least one discharge opening;

the at least one upper piston returns to an upper position while the at least one lower piston is raised to a position that is flush with the at least one discharge opening; and the at least one lower position is then lowered as the metering carriage is returns to a position in registration with the at least one discharge opening.

* * * * *